(12) United States Patent
Shang

(10) Patent No.: US 10,419,201 B2
(45) Date of Patent: Sep. 17, 2019

(54) METHOD AND DEVICE FOR IMPLEMENTING TIMESLOT SYNCHRONIZATION

(71) Applicant: ZTE CORPORATION, Shenzhen, Guangdong Province (CN)

(72) Inventor: Yingchun Shang, Shenzhen (CN)

(73) Assignee: ZTE CORPORATION (CN)

( * ) Notice: Subject to any disclaimer, the term of this patent is extended or adjusted under 35 U.S.C. 154(b) by 57 days.

(21) Appl. No.: 15/526,340

(22) PCT Filed: Aug. 10, 2015

(86) PCT No.: PCT/CN2015/086533
§ 371 (c)(1),
(2) Date: May 12, 2017

(87) PCT Pub. No.: WO2016/074508
PCT Pub. Date: May 19, 2016

(65) Prior Publication Data
US 2017/0317813 A1    Nov. 2, 2017

(30) Foreign Application Priority Data

Nov. 12, 2014    (CN) .......................... 2014 1 0635277

(51) Int. Cl.
*H04J 14/00* (2006.01)
*H04L 7/00* (2006.01)
(Continued)

(52) U.S. Cl.
CPC ......... *H04L 7/0075* (2013.01); *H04B 10/275* (2013.01); *H04J 3/06* (2013.01);
(Continued)

(58) Field of Classification Search
CPC ..... H04L 7/0075; H04L 12/403; H04L 12/43; H04L 41/12; H04L 45/02; H04B 10/275;
(Continued)

(56) References Cited

U.S. PATENT DOCUMENTS 6,738,582 B1    5/2004 Moshe et al.
2003/0185229 A1    10/2003 Shachar et al.
(Continued)

FOREIGN PATENT DOCUMENTS

CN    101052000 A    10/2007
CN    104702397 A    6/2015
(Continued)

OTHER PUBLICATIONS

Yahaya et al., "Priority-based Time Slot Assignment Algorithm for Hierarchical Time slices Optical switched Network," 2011, ICSNC, pp. 199-205.*

(Continued)

*Primary Examiner* — Tesfaldet Bocure
(74) *Attorney, Agent, or Firm* — McDonald Hopkins LLC

(57) ABSTRACT

Provided are a method and a device for implementing timeslot synchronization. The method includes: a master node performing timeslot synchronization training of an OBTN according to a timeslot length of the OBTN. By adopting the solution provided by the embodiments of the present disclosure, an FDL does not need to be considered in node design, the node design is simplified, the time precision of synchronization is improved and no loss is caused to optical efficiency.

18 Claims, 7 Drawing Sheets

(51) Int. Cl.
H04J 3/06 (2006.01)
H04L 12/26 (2006.01)
H04L 12/43 (2006.01)
H04Q 11/00 (2006.01)
H04L 12/24 (2006.01)
H04L 12/751 (2013.01)
H04B 10/275 (2013.01)
H04L 12/403 (2006.01)

(52) U.S. Cl.
CPC .......... *H04J 3/0623* (2013.01); *H04L 12/403* (2013.01); *H04L 12/43* (2013.01); *H04L 41/12* (2013.01); *H04L 43/0852* (2013.01); *H04L 45/02* (2013.01); *H04Q 11/0066* (2013.01); *H04Q 11/0067* (2013.01); *H04Q 2011/0045* (2013.01); *H04Q 2011/0079* (2013.01); *H04Q 2011/0092* (2013.01)

(58) Field of Classification Search
CPC ........ H04J 3/06; H04J 3/0623; H04Q 11/066; H04Q 11/0067
USPC .......................................................... 398/48
See application file for complete search history.

(56) References Cited

U.S. PATENT DOCUMENTS

| 2003/0189901 | A1  | 10/2003 | Ozugur et al. |
| 2003/0198471 | A1* | 10/2003 | Ovadia .............. H04Q 11/0066 398/47 |
| 2004/0042796 | A1  | 3/2004  | Con-Carolis et al. |
| 2006/0147207 | A1  | 7/2006  | Den Hollander et al. |
| 2008/0075047 | A1* | 3/2008  | Shankara ............ H04L 45/7453 370/337 |

FOREIGN PATENT DOCUMENTS

| CN | 104796212  | A  | 7/2015  |
| EP | 2779484    | A1 | 9/2014  |
| EP | 3079307    | A1 | 10/2016 |
| EP | 3098982    | A1 | 11/2016 |
| JP | 2005-522090| A  | 7/2005  |
| JP | 2005-522091| A  | 7/2005  |
| WO | 2013187474 | A1 | 12/2013 |
| WO | 2015109795 | A1 | 7/2015  |

OTHER PUBLICATIONS

Ilia Baldine, Center for Advanced Network Research, RTI International, Inc.,et al., 3040 Cornwallis Road, PO Box 12194, Research Triangle Park, An Intra- and Inter-Domain Routing Architecture for Optical Burst Switched (OBS) Networks, 2005 IEEE. XP010890335.
Basem Shihada, University of Waterloo, et al., Transport Control Protocol in Optical Burst Switched Networks: Issues, Solutions, and Challenges, IEEE Communications Surveys & Tutorials, 2nd Quarter 2008, vol. 10, No. 2. XP011230664.
Miroslaw Klinkowski, et al., Performance Overview of the Offset Time Emulated Obs Network Architecture, Journal of Lightwave Technology, vol. 27, No. 14, Jul. 15, 2009, IEEE. XP011264302.
Lei Liu, et al., Dynamic Provisioning of Self-Organized Consumer Grid Services Over Integrated Obsiwson getworks, Journal of Lightwave Technology, vol. 30, No. 5, Mar. 1, 2012, 2011 IEEE. XP011405629.
Oliver Yu, Department of ECE, University of Illinois at Chicago, 851 S. Morgan Street, 1020 SEO, Chicago, et al., Robust Timely Scheduled Optical Burst Switching, OSA 1-55752-830-6. XP031146463.
Sunish Kumar O S, sunishkumaros@gmail.com, et al., A Statistical Modeling of QoS in an Optical Burst Switched Network, IEEE CONECCT2013.
Christoph M. Gauger, University of Stuttgart, IKR, Germany, et al.,Optical Burst Transport Network (OBTN)—A Novel Architecture for Efficient Transport of Optical Burst Data over Lambda Grids, IEEE, May 12-14, 2005. XP010832737.
Yu, Siyang."The Study on Key Technologies of Optical Burst Transport Network" China Master's These full-text database information Science Part, vol./, No. 11, Nov. 15, 2013.

* cited by examiner

METHOD AND DEVICE FOR IMPLEMENTING TIMESLOT SYNCHRONIZATION

TECHNICAL FIELD

The present disclosure relates to an optical network technology, in particular to a method and a device for implementing timeslot synchronization of an Optical Burst Transport Network (OBTN).

BACKGROUND

Global data traffic explosively increases and emerging services represented by video and streaming media services are rapidly developed, such that data services having dynamic, high bandwidth and high quality requirements become main network traffic and drives networks to evolve towards grouping. In the aspect of transport networks, it can be seen that they are developed from traditional Synchronous Digital Hierarchy (SDH) circuit switching networks to SDH-based Multi-Service Transfer Platforms (MSTP) having a multi-service access function and gradually evolve into Packet Transport Networks at current, which is exactly a result of data development of network traffic. Fundamentally, circuit switching networks can only provide rigid pipes and coarse-granularity switching and cannot effectively satisfy demands for dynamic nature and burst nature of data services, while flexible pipes and statistical multiplexing features of packet switching networks naturally adapt to data services. However, packet switching in the related art is basically processed based on an electric layer, the cost is high, the energy consumption is great, the processing bottleneck is gradually prominent with the rapid increase of traffic, and it is difficult to adapt to the requirements of high speed, flexibility, low cost and low energy consumption on networks. Optical networks have the advantages of low cost, low energy consumption and high-speed great capacity. However, traditional optical circuit switching networks (such as Wavelength Division Multiplexing WDM) and Optical Transport Networks (OTNs) can only provide large-granularity rigid pipes, lack for flexibility of electric packet switching and cannot effectively bear data services.

In access networks, Gigabit-Capable Passive Optical Network (GPON) technology combines the advantages of the optical layer and the electric layer to a certain extent. In a downlink direction, it adopts an optical layer broadcasting mode to distribute downlink signals sent by an Optical Line Terminal (OLT) to each Optical Network Unit (ONU) through an optical splitter, and at the same time, a bandwidth map of an uplink frame is carried in a downlink frame header to indicate sending time and length of uplink data of each ONU; in an uplink direction, each ONU sends data according to the indication of the bandwidth map, and the data are multiplexed to a wavelength channel through an optical coupler and are uploaded to the OLT. Thereby, the GPON has the features of high speed, large capacity and low cost of the optical layer on one hand and realizes optical layer statistic multiplexing of loops of data in the uplink direction, thereby improving the flexibility and the bandwidth utilization rate. The GPON generally adopts a star/tree network topology, its working principle is suitable for bearing multipoint to single point convergent traffic (south-north traffic is dominant), and thus it is successfully applied and deployed in a large scale in access networks.

However, for non-convergent application scenarios such as metropolitan area core networks and data center internal switching networks, the ratio of east-west traffic is very great and even is dominant, and the GPON technology is obviously unsuitable (east-west traffic needs to be forwarded through an OLT electric layer and the GPON capacity is limited). The OBTN adopts an all-optical switching technology based on Optical Burst (OB), has a capability that any node of a network provides on demand and rapidly schedules inter-optical layer bandwidth, and it can dynamically adapt to and well support various traffic (such as south-north burst traffic and east-west burst traffic) scenarios, improve resource utilization efficiency and network flexibility, simultaneously reserves the advantages of high speed, great capacity and low cost, and it is applicable to various network topologies such as start, tree and ring topologies. At the same time, data channels and control channels are transmitted by adopting different wavelength, and the separate processing of control signals and data signals is very greatly facilitated.

However, optical burst switching networks in the related art all need to be configured with a Fiber Delay Line (FDL) to enable ring length to be integral times of timeslot length, nodes also need to be configured with an FDL to enable data frames and control frames to reach a relationship such as of having the same arrival time; and an optical burst packet must have a fixed length and a guard interval also has a fixed length. The configuration of the FDL will cause network design to be complex, the length control is comparatively tedious, certain losses will be caused to optical power, a great number of FDL arrays are needed to improve time precision of timeslot synchronization of nodes and this is unrealistic.

SUMMARY

The embodiments of the present disclosure provide a method and a device for implementing timeslot synchronization, which can improve time precision of timeslot synchronization.

The embodiment of the present disclosure provides a method for implementing timeslot synchronization, applied to an Optical Burst Transport Network OBTN, including:

a master node performing timeslot synchronization training of the OBTN according to a timeslot length of the OBTN.

Alternatively, before the master node performs timeslot synchronization training of the OBTN according to the timeslot length of the OBTN, the method further includes:

the master node performing path detection on the OBTN to acquire a network topology structure; and the master node selecting a core path from the acquired network topology structure, detecting a length of the core path or a length of the core path and a length of a non-core path, and calculating the timeslot length according to the length of the core path or the length of the core path and the length of the non-core path.

Alternatively, the step of the master node performing path detection on the OBTN to acquire the network topology structure includes:

the master node respectively sending a first testing control frame containing node information of the master node to all slave nodes or agent master nodes connected with the master node;

after the first testing control frame is received, the slave nodes or the agent master nodes adding node information of the slave nodes or the agent master nodes into the first testing control frame to form a path, and sending the first testing control frame added with the node information of the slave nodes or the agent master nodes to other nodes connected with the slave nodes or the agent master nodes after a fixed time delay; and after all first testing control frames are received, the master node integrating paths in all first testing control frames to obtain the network topology structure.

Alternatively, the step of the master node performing timeslot synchronization training of the OBTN according to the timeslot length of the OBTN includes:

the master node determining a first time interval that the master node in the core path of the OBTN sends a control frame prior to a data frame according to the timeslot length of the OBTN and determining a third time delay that each slave node or agent master node in the core path receives or sends the control frame prior to the data frame according to the first time interval and the timeslot length, the agent master node determining a fourth time delay that each slave node or agent master node in the non-core path of the OBTN receives or sends the control frame prior to the data frame according to the third time delay of the agent master node and the timeslot length.

Alternatively, the step of the master node determining the first time interval that the master node in the core path sends the control frame prior to the data frame according to the timeslot length of the OBTN includes:

the master node sequentially sending a first testing data frame and a second testing control frame to a slave node or agent master node in the core path according to the timeslot length of the OBTN; the slave node or the agent master node forwarding the second testing control frame to a next node in the core path after a fixed time delay after the second testing control frame is received, and directly forwarding the first testing data frame to a next node in the core network after the first testing data frame is received; and the master node measuring and receiving a first time delay that the second testing control frame and the first testing data frame return to the master node;

the agent master node sequentially sending a second testing data frame and a third testing control frame to a slave node in a non-core path in which the agent master node is located according to the timeslot length of the OBTN; the slave node forwarding the third testing control frame to a next node in the non-core path after a fixed time delay after the third testing control frame is received, and directly forwarding the second testing data frame to a next node in the non-core network after the second testing data frame is received; and the agent master node measuring and receiving a second time delay that the third testing control frame and the second testing data frame return to the agent master node;

the master node receiving the second time delay from the agent master node; and the master node determining the first time interval that the master node in the core path sends the control frame prior to the data frame according to the first time delay and the second time delay;

or the master node sequentially sending a first testing data frame and a second testing control frame to a slave node or agent master node in the core path according to the timeslot length of the OBTN; the slave node or the agent master node forwarding the second testing control frame to a next node in the core path after a fixed time delay after the second testing control frame is received, and directly forwarding the first testing data frame to a next node in the core network after the first testing data frame is received; and the master node acquiring a second time interval between a moment that the second testing control frame is sent and a moment that the second testing control frame is received, and calculating a difference between the acquired second time interval and the length of the core path to obtain a first time delay;

the agent master node sequentially sending a second testing data frame and a third testing control frame to a slave node in the non-core path in which the agent master node is located according to the timeslot length of the OBTN; the slave node forwarding the third testing control frame to a next node in the non-core path after a fixed time delay after the third testing control frame is received, and directly forwarding the second testing data frame to a next node in the non-core network after the second testing data frame is received; and the agent master node acquiring a third time interval between a moment that the third testing control frame is sent and a moment that the third testing control frame is received, and calculating a difference between the obtained third time interval and the length of the non-core path in which the agent master node is located to obtain a second time delay;

the master node receiving the second time delay from the agent master node; and the master node determining the first time interval that the master node in the core path sends the control frame prior to the data frame according to the first time delay and the second time delay.

Alternatively, the step of determining the third time delay that each slave node or agent master node in the core path receives or sends the control frame prior to the data frame according to the first time interval and the timeslot length includes:

the master node sequentially sending a third testing data frame and a fourth testing control frame to a slave node or agent master node in the core path according to the timeslot length, the fourth testing control frame being sent prior to the third testing data frame by the first time interval; and the slave node or the agent master node measuring the third time delay that the slave node or the agent master node receives the fourth testing control frame and the third testing data frame, forwarding the third testing data frame to a next slave node in the core path after the third testing data frame is received, and forwarding the fourth testing control frame to a next slave node in the core path after a fixed time delay after the fourth testing control frame is received.

Alternatively, the step of determining the fourth time delay that each slave node or agent master node in the non-core path of the OBTN receives or sends the control frame prior to the data frame according to the third time delay of the agent master node and the timeslot length includes:

the agent master node sequentially sending a fourth testing data frame and a fifth testing control frame to a slave node in the non-core path according to the timeslot length, the fifth testing control frame being sent prior to the fourth testing data frame by a difference between the third time delay of the agent master node and the fixed time delay; and each slave node measuring the fourth time delay that the slave node receives the fifth testing control frame and the fourth testing data frame, forwarding the fourth testing data frame to a next slave node in the non-core path after the fourth testing data frame is received, and forwarding the fifth testing control frame to a next slave node in the non-core path after a fixed time delay after the fifth testing control frame is received;

or the agent master node forwarding the third testing data frame and the fourth testing control frame from the master node to each slave node in the non-core path; and each slave node measuring the fourth time delay that each slave node receives the fourth testing control frame and the third testing data frame, forwarding the third testing data frame to a next slave node in the non-core path after the third testing data frame is received and forwarding the fourth testing control frame to a next slave node in the non-core path after a fixed time delay after the fourth testing control frame is received.

Alternatively, the method further includes: the master node receiving a bandwidth request from a slave node in the core path;

the master node containing information indicating a timeslot that the slave node adopts a timeslot length to send data in bandwidth map information and sending the bandwidth map information to each slave node in the core path; and each slave node in the core path sending or receiving the data frame and the control frame at corresponding timeslot positions according to the received bandwidth map information, the third time delay and a timeslot position at which the control frame is received;

or the master node receiving a bandwidth request from a slave node in the non-core path;

the master node determining a path that the slave node sends data to a receiving node according to the bandwidth request;

the master node judging that the determined path does not cross an agent master node, containing information indicating a timeslot that the slave node adopts a timeslot length to send data in bandwidth map information and sending the bandwidth map information to each slave node in the non-core path; and each slave node in the non-core path sending or receiving the data frame and the control frame at corresponding timeslot positions according to the received bandwidth map information, the fourth time delay and a timeslot position at which the control frame is received;

or each agent master node calculating an excessive time length in the non-core path according to the length of the non-core path in which the agent master node is located, and sending the calculated excessive time length to the master node;

the master node receiving a bandwidth request from a slave node in the non-core path and determining a path that the slave node sends data to a receiving node according to the bandwidth request;

the master node judging that the determined path crosses an agent master node and the excessive time length is greater than zero, and the master node containing information indicating a timeslot that crosses two timeslots is used to send data by the slave node in bandwidth map information and sending the bandwidth map information to each slave node in the core path and the non-core path; and the master node judging that the determined path crosses an agent master node and the excessive time length is equal to zero, and the master node containing information indicating a timeslot that the slave node adopts a timeslot length to send data in bandwidth map information and sending the bandwidth map information to each slave node in the core path and the non-core path; and each slave node sending or receiving the data frame and the control frame at corresponding timeslot positions according to the received bandwidth map information, the fourth time delay and a timeslot position at which the control frame is received.

The embodiment of the present disclosure further provides a master node, including:

a synchronization module arranged to perform timeslot synchronization training of an OBTN according to a timeslot length of the OBTN.

Alternatively, the master node further includes:

a detection module arranged to perform path detection on the OBTN to acquire a network topology structure; and select a core path from the acquired network topology structure, detect a length of the core path or a length of the core path and a length of a non-core path; and a calculation module arranged to calculate the timeslot length according to the length of the core path or the length of the core path and the length of the non-core path.

Alternatively, an operation that the detection module performs path detection on the OBTN to acquire the network topology structure includes:

respectively sending a first testing control frame containing node information of the master node to all slave nodes or agent master nodes connected with the master node; and after all first testing control frames are received, integrating paths in all first testing control frames to obtain the network topology structure.

Alternatively, the synchronization module is arranged to:

determine a first time interval that the master node in the core path sends a control frame prior to a data frame according to the timeslot length of the OBTN and determine a third time delay that each slave node or agent master node in the core path receives or sends the control frame prior to the data frame according to the first time interval and the timeslot length of the OBTN.

Alternatively, an operation that the synchronization module determines the first time interval that the master node in the core path sends the control frame prior to the data frame according to the timeslot length of the OBTN includes:

sequentially sending a first testing data frame and a second testing control frame to a slave node or agent master node in the core path according to the timeslot length of the OBTN, and measuring and receiving a first time delay that the second testing control frame and the first testing data frame return to the master node; receiving a second time delay from the agent master node; and determining the first time interval that the master node in the core path sends the control frame prior to the data frame according to the first time delay and the second time delay;

or sequentially sending a first testing data frame and a second testing control frame to a slave node or agent master node in the core path according to the timeslot length of the OBTN; acquiring a second time interval between a moment that the second testing control frame is sent and a moment that the second testing control frame is received, and calculating a difference between the second time interval and the length of the core path to obtain a first time delay; receiving a second time delay from the agent master node; and determining the first time interval that the master node in the core path sends the control frame prior to the data frame according to the first time delay and the second time delay.

Alternatively, an operation that the synchronization module determines the third time delay that each slave node or agent master node in the core path receives or sends the control frame prior to the data frame according to the first time interval and the timeslot length of the OBTN includes:

sequentially sending a third testing data frame and a fourth testing control frame to a slave node or agent master node in the core path according to the timeslot length of the OBTN, the fourth testing control frame being sent prior to the third testing data frame by the first time interval.

Alternatively, the master node further includes:

a first receiving module arranged to receive a bandwidth request from a slave node in the core path; and a first sending module arranged to contain information indicating a timeslot that the slave node adopts a timeslot length to send data in bandwidth map information and send the bandwidth map information to each slave node in the core path;

or a first receiving module arranged to receive a bandwidth request from a slave node in the non-core path and determine a path that the slave node sends data to a receiving node according to the bandwidth request; and a first sending module arranged to judge that the determined path does not cross an agent master node, contain information indicating a timeslot that the slave node adopts a timeslot length to send data in bandwidth map information and send the bandwidth map information to each slave node in the non-core path;

or a first receiving module arranged to receive an excessive time length in the non-core path sent by each agent master node, receive a bandwidth request from a slave node in the non-core path and determine a path that the slave node sends data to a receiving node according to the bandwidth request; and a first sending module arranged to judge that the determined path crosses an agent master node and the excessive time length is greater than zero, contain information indicating a timeslot that crosses two timeslots is used to send data by the slave node in bandwidth map information and send the bandwidth map information to each slave node in the core path and the non-core path; and judge that the determined path crosses an agent master node and the excessive time length is equal to zero, contain information indicating a timeslot that the slave node adopts a timeslot length to send data in bandwidth map information and send the bandwidth map information to each slave node in the core path and the non-core path.

The embodiment of the present disclosure further provides an agent master node, including:

a second receiving module arranged to receive a first testing data frame and a second testing control frame from a master node; and measure and receive a second time delay that a third testing control frame and a second testing data frame return to the agent master node; and a second sending module arranged to forward the second testing control frame to a next node in the core path after a fixed time delay after the second testing control frame is received, and directly forward the first testing data frame to a next node in the core network after the first testing data frame is received; sequentially send the second testing data frame and the third testing control frame to a slave node in a non-core path in which the agent master node is located according to a timeslot length of an OBTN; and send the second time delay to the master node.

Alternatively, the second receiving module is further arranged to, after the first testing control frame is received, add node information of the agent master node into the first testing control frame to form a path; and the second sending module is further arranged to send the first testing control frame added with the node information of the agent master node to other nodes connected with the agent master node after a fixed time delay.

Alternatively, the second sending module is further arranged to sequentially send the second testing data frame and the third testing control frame to a slave node in the non-core path in which the agent master node is located according to the timeslot length of the OBTN; and send the second time delay to the master node; and the second receiving module is further arranged to measure and receive a second time delay that the third testing control frame and the second testing data frame return to the agent master node; or acquire a third time interval between a moment that the third testing control frame is sent and a moment that the third testing control frame is received, and calculate a difference between the obtained third time interval and the length of the non-core path in which the agent master node is located to obtain a second time delay.

Alternatively, the second receiving module is further arranged to measure a third time delay that the second receiving module receives a fourth testing control frame and a third testing data frame; and the second sending module is further arranged to forward the third testing data frame to a next slave node in the core path after the third testing data frame is received, and forward the fourth testing control frame to a next slave node in the core path after a fixed time delay after the fourth testing control frame is received.

Alternatively, the second sending module is further arranged to determine a fourth time delay that each slave node or agent master node in the non-core path receives or sends the control frame prior to the data frame according to the third time delay of the agent master node and the timeslot length of the OBTN.

Alternatively, the second sending module is arranged to sequentially send a fourth testing data frame and a fifth testing control frame to a slave node in the non-core path according to the timeslot length of the OBTN, the fifth testing control frame being sent prior to the fourth testing data frame by a difference between the third time delay of the agent master node and the fixed time delay.

Alternatively, the second receiving module is further arranged to receive a third testing data frame and a fourth testing control frame from the master node; and the second sending module is further arranged to send the third testing data frame and the fourth testing control frame to each slave node in the non-core network.

The embodiment of the present disclosure further provides a slave node, including:

a third receiving module arranged to receive a second testing control frame and a first testing data frame; and a third sending module arranged to forward the second testing control frame to a next node in a core path after a fixed time delay after the second testing control frame is received, and directly forward the first testing data frame to a next node in the core network after the first testing data frame is received.

Alternatively, the third receiving module is further arranged to, after the first testing control frame is received, add node information of the slave node into the first testing control frame to form a path; and the third sending module is further arranged to send the first testing control frame added with the node information of the slave node to other nodes connected with the slave node after the fixed time delay.

Alternatively, the third receiving module is further arranged to receive a third testing control frame and a second testing data frame; and the third sending module is further arranged to forward the third testing control frame to a next node in a non-core path after a fixed time delay after the third testing control frame is received, and directly forward the second testing data frame to a next node in the non-core network after the second testing data frame is received.

Alternatively, the third receiving module is further arranged to measure a third time delay that the third receiving module receives a fourth testing control frame and a third testing data frame; and the third sending module is further arranged to forward the third testing data frame to a next slave node in the core path after the third testing data frame is received, and forward the fourth testing control frame to a next slave node in the core path after a fixed time delay after the fourth testing control frame is received.

Alternatively, the third receiving module is further arranged to measure a fourth time delay that the third receiving module receives a fifth testing control frame and a fourth testing data frame; and the third sending module is further arranged to forward the fourth testing data frame to a next slave node in a non-core path after the fourth testing data frame is received, and forward the fifth testing control frame to a next slave node in the non-core path after a fixed time delay after the fifth testing control frame is received.

Alternatively, the third receiving module is further arranged to measure a fourth time delay that the third receiving module receives the fourth testing control frame and the third testing data frame; and the third sending module is further arranged to forward the third testing data frame to a next slave node in the non-core path after the third testing data frame is received, and forward the fourth testing control frame to a next slave node in the non-core path after a fixed time delay after the fourth testing control frame is received.

Alternatively, the third sending module or the third receiving module is further arranged to:

send or receive the data frame or the control frame at corresponding timeslot positions according to received bandwidth map information, the received third time delay or fourth time delay and a timeslot position at which the control frame is received.

The embodiment of the present disclosure further provides a computer-readable storage medium, storing program instructions, which, when executed, are capable of implementing the method.

As compared with the related art, in the embodiments of the present disclosure, the master node performs timeslot synchronization training of the OBTN according to the timeslot length of the OBTN. By adopting the solution provided by the embodiments of the present disclosure, an FDL does not need to be considered in node design, the node design is simplified, the time precision of synchronization is improved and no loss is caused to optical efficiency.

DETAILED DESCRIPTION

The embodiments of the present disclosure will be described below with reference to the drawings. It needs to be stated that the embodiments in the present application and the various modes in the embodiments may be mutually combined under a situation of no conflict.

Figure 1:
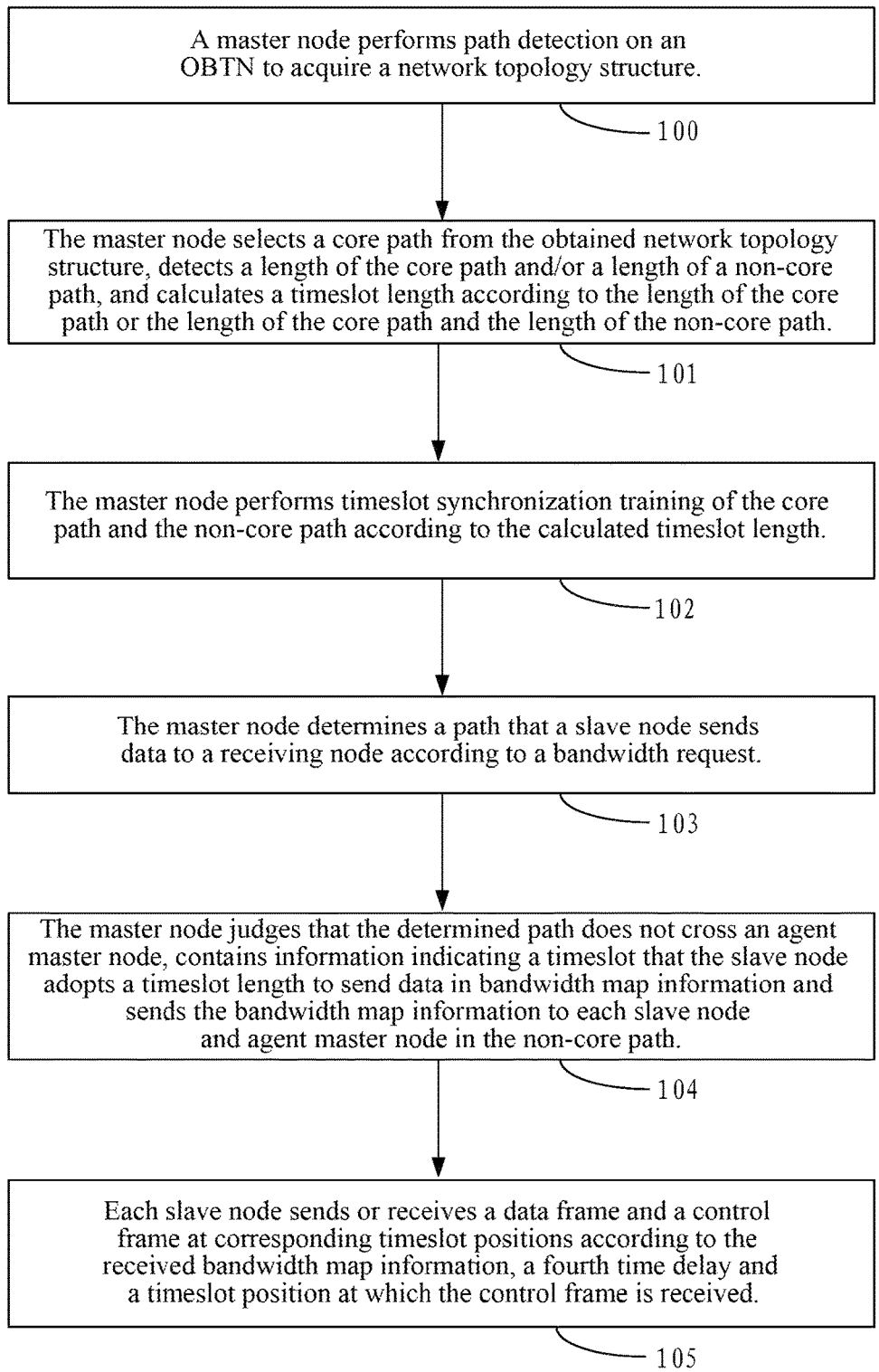
FIG. 1 illustrates a flowchart of a method for implementing timeslot synchronization according to the embodiment of the present disclosure.
Figure 2:
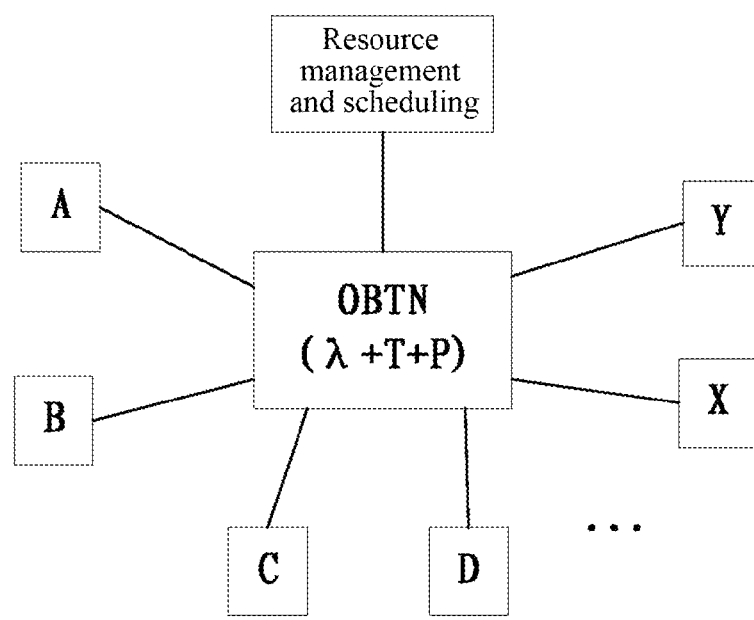
FIG. 2 illustrates a schematic diagram of structural components of an OBTN according to the embodiment of the present disclosure.

Referring to FIG. 1, the embodiment of the present disclosure provides a method for implementing timeslot synchronization, applied to an OBTN. FIG. 2 illustrates a schematic diagram of structural components of an OBTN. As illustrated in FIG. 2, the OBTN includes a plurality of nodes, respectively A, B, C, D . . . X, Y, etc., and these nodes are connected together through an OBTN network.

The method includes the following steps.

In step 100, a master node performs path detection on an OBTN to acquire a network topology structure.

In this step, the master node respectively sends a first testing control frame containing node information of the master node to all slave nodes or agent master nodes connected with the master node; after the first testing control frame is received, the slave nodes or the agent master nodes add node information of the slave nodes or the agent master nodes into the first testing control frame to form a path, and send the first testing control frame added with the node information of the slave nodes or the agent master nodes to other nodes connected with the slave nodes or the agent master nodes after a fixed time delay; and after all first testing control frames are received, the master node integrates paths in all first testing control frames to obtain the network topology structure.

Herein, the node information may be node names or Internet Protocol (IP) addresses.

Herein, the other nodes refer to nodes connected therewith, except a node which sends a control frame thereto.

For example, FIG. 3 illustrates a schematic diagram of OBTN multiple tangent ring networks. As illustrated in FIG. 3, when path detection needs to be performed on the OBTN multiple tangent ring networks, a master node A respectively sends a control frame to a node B and a node D, the control frame containing a node name of the node A; after the node B receives the control frame, the node B adds a node name of the node B into the control frame to form a path from the node A to the node B and sends the control frame to a slave node A2 and a slave C2; similarly, after the node D receives the control frame, the node D adds a node name of the node D into the control frame to form a path from the node A to the node D and sends the control frame to a slave node A3 and a slave C3; and thereby, the master node A finally receives fourteen control frames, each control frame contains a path and these paths are respectively as follows:

A→B→C→D→A, A→D→C→B→A;
A→B→C2→B2→A2→B→C→D→A,
A→B→A2→B2→C2→B→C→D→A;
A→B→C2→B2→A2→B→A,
A→B→A2→B2→C2→B→A;
A→B→C→D→A3→D3→C3→D→A,
A→B→C→D→C3→D3→A3→D→A;
A→B→C→D→A3→D3→C3→D→C→B→A,
A→B→C→D→C3→D3→A3→D→C→B→A;
A→B→C2→B2→A2→B→C→D→A3→D3→C3→D→A,
A→B→A2→B2→C2→B→C→D→A3→D3→C3
A→B→C2→B2→A2→B→C→D→C3→D3→A3→D→A,
A→B→A2→B2→C2→B→C→D→C3→D3→A 3→D→A.

Figure 3A:
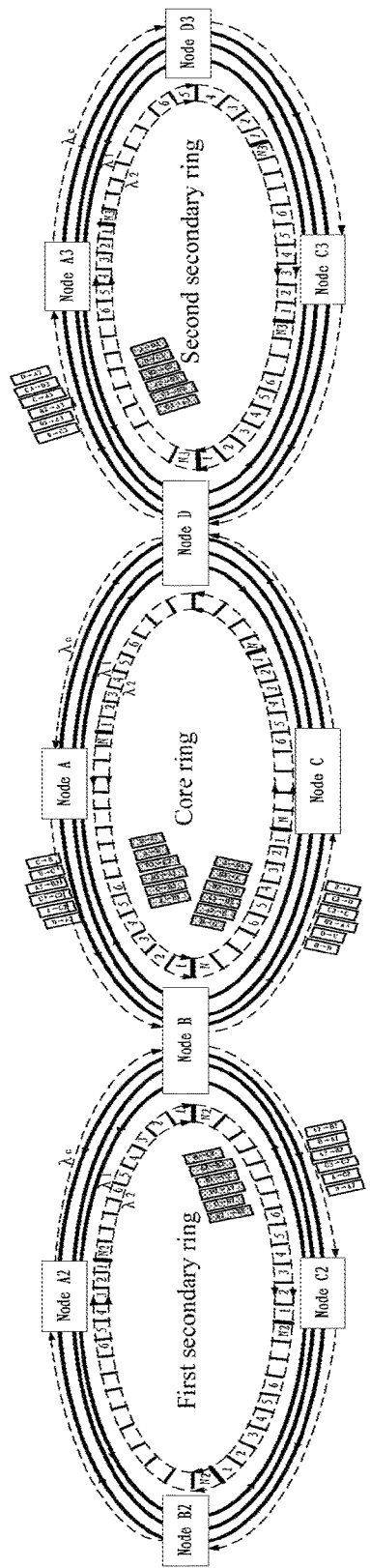
FIG. 3(a) illustrates a schematic diagram of OBTN multiple tangent ring networks.
Figure 3B:
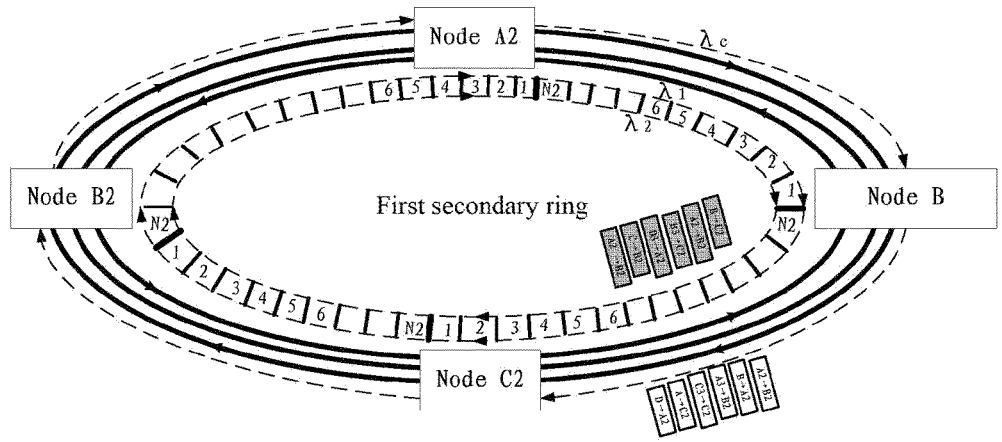
FIG. 3(b) illustrates a schematic diagram of a first secondary ring in OBTN multiple tangent ring networks in FIG. 3(a).
Figure 3C:
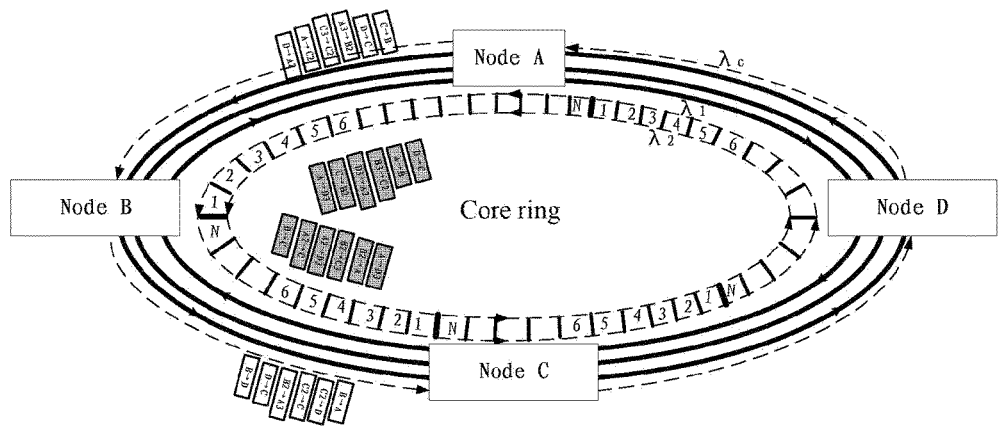
FIG. 3(c) illustrates a schematic diagram of a core ring in OBTN multiple tangent ring networks in FIG. 3(a).
Figure 3D:
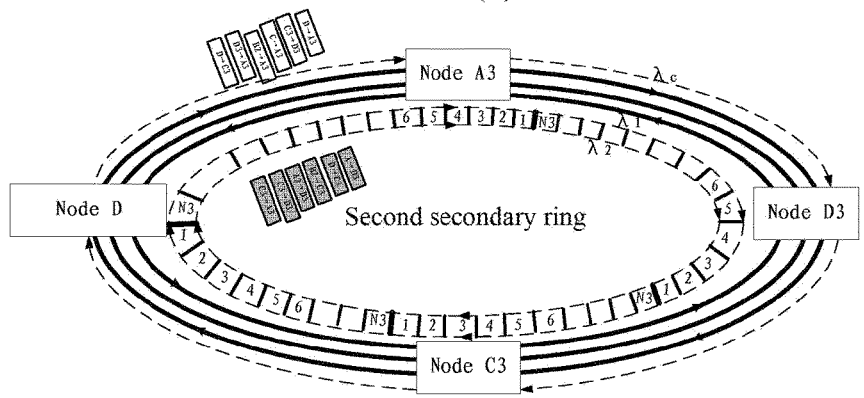
FIG. 3(d) illustrates a schematic diagram of a second secondary ring in OBTN multiple tangent ring networks in FIG. 3(a).

Based on the above-mentioned paths, the node A may integrate the paths to obtain that the OBTN multiple tangent ring networks include three ring networks, respectively A→B→C→D→A (as illustrated in FIG. 3(c)), B→A2→B2→C2→B (as illustrated in FIG. 3(b)) and D→A3→D3→C3→D (as illustrated in FIG. 3(d)).

In this step, after the OBTN network works normally, the path detection of the network also needs to be performed in real time, so as to monitor the change of the network topology in real time and make corresponding adjustment.

In step 101, the master node selects a core path from the obtained network topology structure, detects a length of the core path or a length of the core path and a length of a non-core path, and calculates a timeslot length according to the length of the core path or the length of the core path and the length of the non-core path.

In this step, a simple network (such as a ring network or a chain network) in which the master node is located may be selected as the core network, and a simple network which is located at network core position may also be selected as the core path.

In the network topology structure, other simple networks and the core network are connected through agent master nodes. A core ring illustrated in FIG. 3(c) is a core path, a first secondary ring in FIG. 3(b) and a second secondary ring in FIG. 3(d) are both non-core paths, and a node B and a node D between the core path and the non-core paths are both agent master nodes.

For example, in FIG. 3, a ring network A→B→C→D→A in the OBTN multiple tangent ring networks may be selected as a core network (as illustrated in FIG. 3(c)), and thus a ring network B→A2→B2→C2→B and a ring network D→A3→D3→C3→D are secondary rings and are respectively a first secondary ring (as illustrated in FIG. 3(b)) and a second secondary ring (as illustrated in FIG. 3(d)). Herein, the core ring includes a node A, a node B, a node C and a node D, the node A is a master node, the node B and the node D are respectively located in the first secondary ring and the second secondary ring, and the node B and the node D are respectively agent master nodes, the node B executes an agent function of the master node in the first secondary ring and the node D executes an agent function of the master node in the second secondary ring.

The core network, the first secondary ring and the second secondary ring are bidirectional ring networks. For example, an inner ring optical path direction of the core ring is a clockwise direction while an outer ring is an anticlockwise direction. A system defaults the outer ring as a working ring and the inner ring as a protection ring, services all go along the outer ring under normal situations and the inner ring is in an idle state; and the inner ring and the outer ring may also be enabled to be simultaneously in a working state. A control channel λc is kept in the same direction as the outer ring, and a control channel may also be configured on the inner ring.

In this step, the lengths of the non-core paths are obtained through detection by the agent master nodes, the agent master nodes may detect the lengths of the non-core paths under the instruction of the master node and may also autonomously trigger the detection of the lengths of the non-core paths.

In this step, when the core path or the non-core path is a ring network, the length of the core path or the non-core path is ring length; and when the core path or the non-core path is a chain network, the length of the core path or the non-core path is linear length.

In this step, when the timeslot length is calculated according to the length of the core path or the lengths of the core path and the non-core path, the length of the core path should be guaranteed to be integral times of the timeslot length, or the length of the core path and the length of the non-core path is integral times of the timeslot length. For example, it may be 5 times, 12 times or other times.

In this step, the timeslot length includes a timeslot packet length and a timeslot guard interval. Herein, the timeslot packet length and the timeslot guard interval may be both adjusted and only one of them may also be adjusted to achieve the purpose of adjusting the timeslot length, such that the length of the core path is integral times of the timeslot length.

In order to simplify the design and control complexity of network nodes, each node in the network has no FDL, and the master node calculates the timeslot length, the timeslot guard interval and the like by referring to the length of the non-core path as much as possible according to the length of the core path (such as the ring length or the linear length) in the path detection result, such that the length of the core path is integral times of the timeslot length or the length of the core path and the length of the non-core path are both integral times of the timeslot length. The timeslot length, the guard interval between timeslots and the like are all transmitted to each slave node through the control frame in the form of information. As illustrated in FIG. 3, the calculation result is that the timeslot guard interval is T1 and the timeslot packet length is T, and thus the timeslot length is (T+T1).

In this step, after the OBTN network works normally, the master node also needs to detect the length of the core path and/or the non-core path in real time, so as to monitor the change of the length of the core path and/or the non-core path in real time and correspondingly adjust the timeslot length.

Step 100 and step 101 are optional steps.

The method further includes the following steps.

In step 102, the master node performs timeslot synchronization training of the OBTN according to the timeslot length of the OBTN.

In this step, the timeslot length of the OBTN may be the timeslot length calculated in step 101.

This step includes the following operations.

The master node determines a first time interval that the master node in the core path of the OBTN sends a control frame prior to a data frame according to the timeslot length of the OBTN and determines a third time delay that each slave node or agent master node in the core path receives or sends the control frame prior to the data frame according to the first time interval and the timeslot length of OBTN, the agent master node determines a fourth time delay that each slave node or agent master node in the non-core path receives or sends the control frame prior to the data frame according to the third time delay of the agent master node and the timeslot length of the OBTN.

Herein, the operation that the master node determines the first time interval that the master node in the core path sends the control frame prior to the data frame according to the timeslot length of the OBTN includes the following operations:

the master node sequentially sends a first testing data frame and a second testing control frame to a slave node or agent master node in the core path according to the timeslot length of the OBTN; the slave node or the agent master node forwards the second testing control frame to a next node in the core path after a fixed time delay after the second testing control frame is received, and directly forwards the first testing data frame to a next node in the core network after the first testing data frame is received; and the master node measures and receives a first time delay that the second testing control frame and the first testing data frame return to the master node; the agent master node sequentially sends a second testing data frame and a third testing control frame to a slave node in a non-core path in which the agent master node is located; the slave node forwards the third testing control frame to a next node in the non-core path after a fixed time delay after the third testing control frame is received, and directly forwards the second testing data frame to a next node in the non-core network after the second testing data frame is received; and the agent master node measures and receives a second time delay that the third testing control frame and the second testing data frame return to the agent master node; the agent master node sends the second time delay to the master node; and the master node determines the first time interval that the master node in the core path sends the control frame prior to the data frame according to the first time delay and the second time delay.

Herein, the first time delay or the second time delay is a delay caused relative to the testing data frame when the testing control frame is subjected to receiving and transmission processing and short-time caching performed by each node.

Herein, the first time interval is a sum of the first time delay, the time length of bandwidth map allocation information contained in the control frame, the second time delay, the maximum time length in the non-core path and the guard time.

Herein, the time length of the bandwidth map allocation information contained in the control frame and the guard time are preset values. The preset value of the guard time may be 1 us.

Herein, when the master node sends the first testing data frame and the second testing control frame, the first testing data frame contains one or more timeslot lengths, the first testing data frame and the second testing control frame are kept to be equally long and be simultaneously sent, and the second testing control frame contains the number of timeslots and the timeslot length of the first testing data frame; and the agent master node sends the second testing data frame and the third testing control frame, the second testing data frame and the third testing control frame are kept to be equally long and be simultaneously sent, the third testing control frame contains the number of timeslots and the timeslot length of the second testing data frame and an excessive time length in the non-core path in which the agent master node is located.

Or, the operation that the master node determines the first time interval that the master node in the core path sends the control frame prior to the data frame according to the timeslot length of the OBTN includes the following operations:

the master node sequentially sends a first testing data frame and a second testing control frame to a slave node or agent master node in the core path according to the timeslot length of the OBTN; the slave node or the agent master node forwards the second testing control frame to a next node in the core path after a fixed time delay after the second testing control frame is received, and directly forwards the first testing data frame to a next node in the core network after the first testing data frame is received; and the master node acquires a second time interval between a moment that the second testing control frame is sent and a moment that the second testing control frame is received, and calculates a difference between the second time interval and the length of the core path to obtain a first time delay;

the agent master node sequentially sends a second testing data frame and a third testing control frame to a slave node in the non-core path in which the agent master node is located; the slave node forwards the third testing control frame to a next node in the non-core path after a fixed time delay after the third testing control frame is received, and directly forwards the second testing data frame to a next node in the non-core network after the second testing data frame is received; and the agent master node acquires a third time interval between a moment that the third testing control frame is sent and a moment that the third testing control frame is received, and calculates a difference between the obtained third time interval and the length of the non-core path in which the agent master node is located to obtain a second time delay; the agent master node sends the second time delay to the master node; and the master node determines the first time interval that the master node in the core path sends the control frame prior to the data frame according to the first time delay and the second time delay.

Herein, the operation of determining the third time delay that each slave node or agent master node in the core path receives or sends the control frame prior to the data frame according to the first time interval and the timeslot length of the OBTN (the time delay that the control frame is received prior to the data frame is the same as the time delay that the control frame is sent prior to the data frame) includes the following operations:

the master node sequentially sends a third testing data frame and a fourth testing control frame to a slave node or agent master node in the core path according to the timeslot length, the fourth testing control frame being sent prior to the third testing data frame by the first time interval; and the slave node or the agent master node measures the third time delay that the slave node or the agent master node receives the fourth testing control frame and the third testing data frame, forwards the third testing data frame to a next slave node in the core path after the third testing data frame is received, and forwards the fourth testing control frame to a next slave node in the core path after a fixed time delay after the fourth testing control frame is received.

Herein, the third testing data frame contains one or more timeslot lengths, and the fourth testing control frame and the third testing data frame are equally long.

Herein, the operation of determining the fourth time delay that each slave node or agent master node in the non-core path receives or sends the control frame prior to the data frame according to the third time delay of the agent master node and the timeslot length of the OBTN includes the following operations:

the agent master node sequentially sends a fourth testing data frame and a fifth testing control frame to a slave node in the non-core path according to the timeslot length, the fifth testing control frame being sent prior to the fourth testing data frame by a difference between the third time delay of the agent master node and the fixed time delay; and each slave node measures the fourth time delay that the slave node receives the fifth testing control frame and the fourth testing data frame, forwards the fourth testing data frame to a next slave node in the non-core path after the fourth testing data frame is received, and forwards the fifth testing control frame to a next slave node in the non-core path after a fixed time delay after the fifth testing control frame is received.

Or, the operation of determining the fourth time delay that each slave node or agent master node in the non-core path receives or sends the control frame prior to the data frame according to the third time delay of the agent master node and the timeslot length of the OBTN includes the following operations:

the agent master node forwards the third testing data frame and the fourth testing control frame from the master node to each slave node in the non-core path; and each slave node measures the fourth time delay that each slave node receives the fourth testing control frame and the third testing data frame, forwards the third testing data frame to a next slave node in the non-core path after the third testing data frame is received and forwards the fourth testing control frame to a next slave node in the non-core path after a fixed time delay after the fourth testing control frame is received.

Herein, the fourth testing data frame contains one or more timeslot lengths, and the fifth testing control frame and the fourth testing control frame are equally long.

The method provided by the embodiment of the present disclosure further includes the following steps:

the master node receives a bandwidth request from a slave node in the core path;

the master node contains information indicating a timeslot that the slave node adopts a timeslot length to send data in bandwidth map information and sends the bandwidth map information to each slave node in the core path (the bandwidth map information will be finally forwarded to each slave node after the bandwidth map information is sent to the agent master node); and each slave node in the core path sends or receives the data frame and the control frame at corresponding timeslot positions according to the received bandwidth map information, the third time delay and a timeslot position at which the control frame is received.

Herein, the step that the slave node in the core path sends or receives the data frame and the control frame at corresponding timeslot positions according to the received bandwidth map information, the third time delay and the timeslot position at which the control frame is received includes the following operations:

after the control frame is received, the slave node forwards the control frame to a next node after a fixed time delay; and determines a timeslot position at which the data frame is received according to the timeslot position at which the control frame is received, the control frame and the third time delay, and receives the data frame according to the determined timeslot position.

The slave node sends the data frame such that a difference between the timeslot position at which the data frame is sent and the timeslot position at which the data frame is received is integral times of the timeslot length.

Herein, the operation of determining the timeslot position at which the data frame is received according to the timeslot position at which the control frame is received, the control frame and the third time delay includes the following operations:

it is determined that a first timeslot position of the data frame is a sum of the timeslot position at which the control frame is received and the third time delay; and it is determined that an Nth timeslot position of the data frame is a sum of the first timeslot position and (N-1) times of the timeslot length. Herein, N is an integer greater than or equal to 2.

Herein, the control frame includes the number of timeslots and the timeslot length of the data frame.

Herein, each node calculates a time position of a first timeslot of the data frame according to the third time delay of the data frame relative to the control frame and the timeslot position at which the control frame is received, and performs receiving, transmission, connection and disconnection control to a burst packet on each timeslot according to information allocated by a master node bandwidth map, thereby realizing all-optical data burst switching.

In the method provided by the embodiment of the present disclosure, timeslot synchronization training of the OBTN only needs to be performed according to the timeslot length of the OBTN, an FDL does not need to be considered in node design, the node design is simplified, the time precision of synchronization is improved and no loss is caused to optical efficiency.

When the master node receives a bandwidth request from a slave node in the non-core path, the method further includes the following steps.

In step 103, the master node determines a path that a slave node sends data to a receiving node according to a bandwidth request.

In this step, the bandwidth request includes traffic size information and a destination address of data sent by the slave.

In step 104, the master node judges that the determined path does not cross an agent master node, contains information indicating a timeslot that the slave node adopts a timeslot length to send data in bandwidth map information and sends the bandwidth map information to each slave node in the non-core path.

Alternatively, before the master node receives the bandwidth request from the slave node in the non-core path, the method further includes the following step:

each agent master node calculates an excessive time length in the non-core path according to the length of the non-core path in which the agent master node is located, and sends the calculated excessive time length to the master node.

After the master node receives a bandwidth request from a slave node in the non-core path and determines a path that the slave node sends data to a receiving node according to the bandwidth request, the master node judges that the determined path crosses an agent master node and the excessive time length is greater than zero, contains information indicating a timeslot that crosses two timeslots is used to send data by the slave node in bandwidth map information and sends the bandwidth map information to each slave node in the core path and the non-core path (the bandwidth map information will be finally forwarded to each slave after the bandwidth map information is sent to the agent master node, and thus it may be considered as that the bandwidth map information is sent to each slave); and the master node judges that the determined path crosses an agent master node and the excessive time length is equal to zero, and the master node contains information indicating a timeslot that the slave node adopts a timeslot length to send data in bandwidth map information and sends the bandwidth map information to each slave node and agent master node in the core path and the non-core path (the bandwidth map information will be finally forwarded to the slave node after the bandwidth map information is sent to the agent master node).

Herein, the number of timeslots contained in the non-core path is a quotient obtained by dividing the length of the non-core path by the received timeslot length, and the excessive time length is a remainder obtained by dividing the ring length of the non-core path by the received timeslot length. In the second secondary ring illustrated in FIG. 3(c), the remainder obtained through calculation according to the ring length of the second secondary ring and the timeslot length T+T1 may be $\Delta L3$, where $0 \le \Delta L3 < T+T1$.

In this step, the bandwidth map information further includes the determined paths.

In this step, the slave node or the agent master node sends the bandwidth request to the master node by adopting the control frame; and after the master node receives the bandwidth request, a Dynamic Bandwidth Allocation (DBA) algorithm is executed according to a current resource state and the bandwidth request to perform wavelength, timeslot and path allocation, and new bandwidth map allocation information is generated and sent to the slave node or the agent master node. Since the network is tunable in transmission and selectable in receiving, the timeslot allocation is more flexible, the reusability is higher, a node can continuously use the same timeslot of a wavelength to send data after a timeslot is received at downlink by the node, and thus the purpose of improving network transmission rate is achieved. This process is continuously and repetitively performed in a network operation process.

In step 105, the slave node sends or receives a data frame and a control frame at corresponding timeslot positions according to the received bandwidth map information, a fourth time delay and a timeslot position at which the control frame is received.

This step includes the following operations:

after the slave receives the control frame, the slave node forwards the control frame to a next node in the path in the bandwidth map information after a fixed time delay; determines a timeslot position at which the data frame is received according to the timeslot position at which the control frame is received, the control frame and the fourth time delay, and receives timeslots in the data frame according to the determined timeslot position.

When it is judged that the path in the bandwidth map information does not cross an agent master node, the slave node sends the data frame such that a difference on an optical layer between the timeslot position at which the data frame is sent and the timeslot position at which the data frame is received is integral times of the timeslot length, i.e., when the same timeslot is received and sent, the time on the optical layer is the same.

When it is judged that the path in the bandwidth map information crosses an agent master node, the slave node sends the data frame such that a difference between the timeslot position at which the data frame is sent or the timeslot position at which the data frame is received and the excessive time length in the bandwidth map information is integral times of the timeslot length, and each timeslot in the data frame occupies two timeslot lengths (i.e., the length of each timeslot in the data frame is two times of the timeslot length).

Herein, the operation of determining the timeslot position at which the data frame is received according to the timeslot position at which the control frame is received, the fourth time delay and the control frame includes the following operations:

it is determined that a first timeslot position of the data frame is a sum of the timeslot position at which the control frame is received and the fourth time delay; and it is determined that an Nth timeslot position of the data frame is a sum of the first timeslot position and (N−1) times of the timeslot length. Herein, N is an integer greater than or equal to 2.

In this step, the control frame includes the number of timeslots and the timeslot length of the data frame.

In this step, each node calculates a time position of a first timeslot of the data frame according to the fourth time delay of the data frame relative to the control frame and the timeslot position at which the control frame is received, and performs receiving, transmission, connection and disconnection control to a burst packet on each timeslot according to information allocated by a master node bandwidth map, thereby realizing all-optical data burst switching.

Figure 4A:
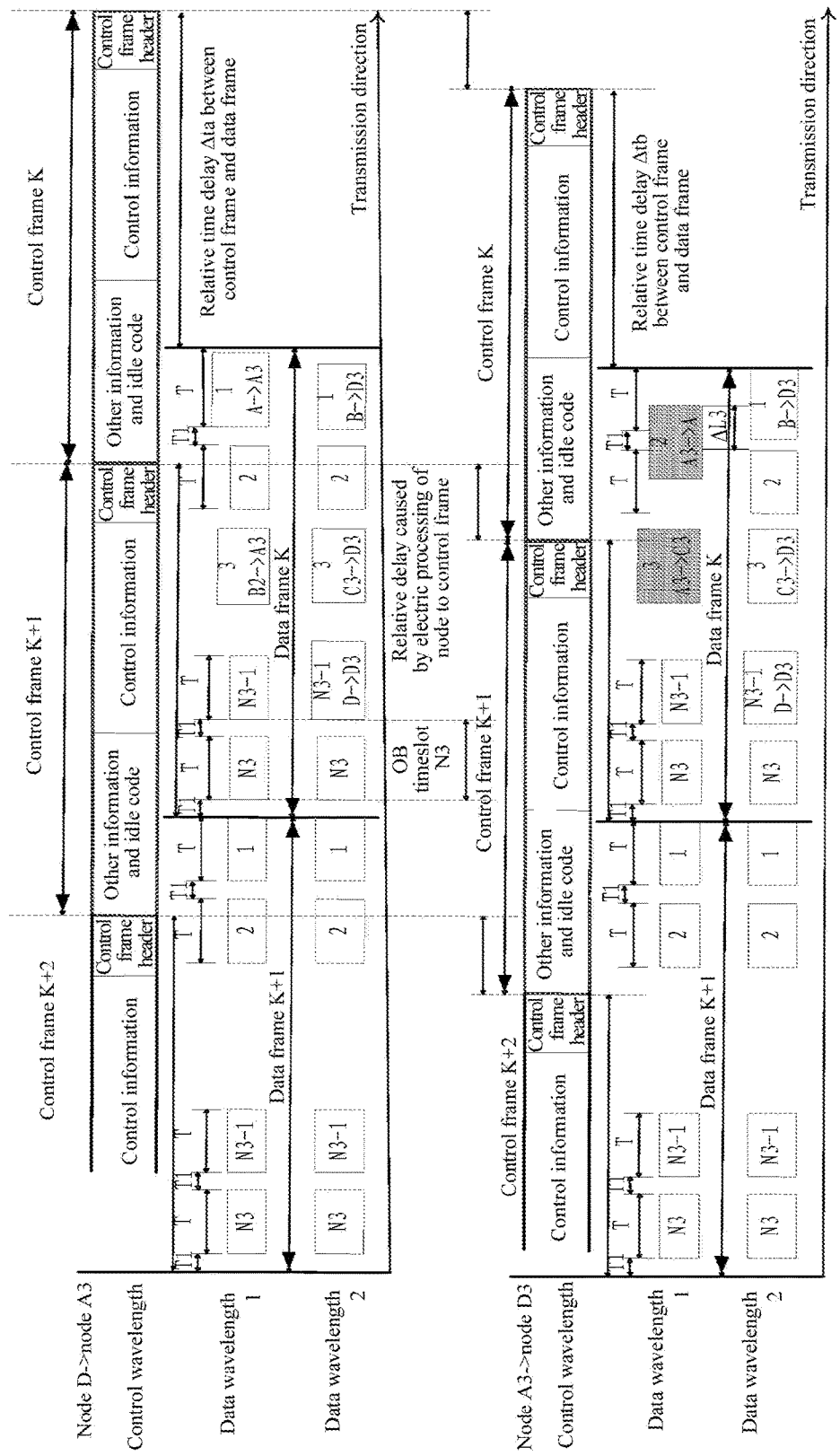
FIG. 4(a) illustrates a schematic diagram of relative time sequences of control frames and data frames.

FIG. 4(a) illustrates a schematic diagram of relative time sequences of control frames and data frames sent by a node D to a node A3 and sent by the node A3 to a node D3 in a second secondary ring. As illustrated in FIG. 4(a), in the second secondary ring, one data frame contains N3 timeslots or burst packets, a length of one burst packet is T, a guard interval between the burst packets is T1, a timeslot length is (T+T1), and the timeslot length and the guard interval are respectively the same as the timeslot length and the guard interval in the core ring. The length of the control length is equal to the length of the data frame, and the control frame includes a control frame header, control information, other information and an idle code, etc.; and the control information contains bandwidth map information.

Since each node does not have an FDL, in order to guarantee that each node can correctly process the burst packet, the control frame needs to arrive at each node prior to the corresponding data frame. Therefore, in the second secondary ring, when the agent master node D (an intersection node between the second secondary ring and the core ring) sends a data frame K to the node A3, a control frame K is sent prior to the data frame K by a period of time Ata. After the node A3 receives the control frame K, the node A3 receives the corresponding data frame K after the fourth time delay of the node A3 according to a training result.

After the node A3 receives the control frame K, when the bandwidth map allocation information about that the node A3 receives and sends data in the control frame K is parsed, bandwidth request information of the node A3 is inserted and the control frame K is sent to the next node D3. Since the control frame K is cached or delayed to a certain extent at the node A3 while no FDL delay exists on a data channel, consequently the time at which the node A3 sends the control frame K is prior to the sending time of the data frame by $\Delta tb$. Accordingly, it can be seen that, relative to the data frame K, the delay time of the control frame K at the node A3 is ($\Delta ta - \Delta tb$).

At the same time, since the second secondary ring intersects the core ring at the node D, the timeslot position received in the second secondary ring is the same as the timeslot position transmitted from the core ring, thus the effect that the timeslot in the second secondary ring is kept to be synchronized with the timeslot position in the core ring is realized, and this requirement is realized in a timeslot synchronization process. Accordingly, it can be seen that, in a path from the node D to the node A3, the timeslot transmitted from the core ring and the timeslot transmitted in the current secondary ring L3 can be both kept at ideal timeslot positions, e.g., timeslot 1 (A→A3) and timeslot 3 (B2→A3) of λ1, and timeslot 1 (B→D3) and timeslot 3 (C3→D3) of λ2 in the data frame K.

Figure 4B:
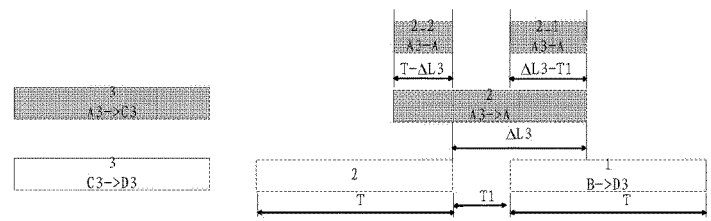
FIG. 4(b) illustrates a schematic diagram of timeslot positions during data transmission across an agent master node.

In this secondary ring L3, the timeslot of sending the data frame is always at an ideal timeslot position. However, whether the timeslot of receiving the data frame are at normal time positions needs to be determined according to whether the ring length of the second secondary ring is integral times of the timeslot length and whether the timeslot arrives at or crosses an agent master node or crosses a ring. If the timeslot of sending the data frame does not arrive at or cross an agent master node or cross a ring, or the timeslot of sending the data frame arrives at or crosses an agent master node or crosses a ring but the length of the second secondary ring is integral times of the timeslot length, it is ok when the timeslot of sending the data frame is at the ideal timeslot position. However, if the length of the second secondary ring is not integral times of the timeslot length, e.g., there is an excessive length of ΔL3 (ΔL3<T+T1), when the timeslot arrives at or crosses an agent master node or crosses a ring, processing as illustrated in FIG. 4(b) may be performed and the timeslot may be sent prior to the ideal position, at which the data frame is sent, by time of ΔL3. Thereby, this timeslot (timeslot 2 with a black background in the drawing) needs to occupy two continuous ideal timeslot positions, i.e., timeslot 1 and timeslot 2 without a black background in the drawing. As a result, after the timeslot arrives at or crosses the agent master node D or crosses the ring, this timeslot is just at the ideal timeslot position and no conflict with other timeslots is caused. Or, this timeslot of sending the data frame may use a next period of time (ΔL3−T1) (timeslot 2_1 with a black background in the drawing) of a previous timeslot or a previous period of time (T−ΔL3) (timeslot 2_2 with a black background in the drawing) of a current timeslot to send the data frame. Thereby, although the timeslot, crossing the agent master node, of sending the data frame on a current path is a partial length of one timeslot, it always falls into a range of ideal timeslot positions before and after crossing the agent master node.

Herein, since T1 is smaller than T, it may be temporarily not considered. When the excessive length ΔL3 in the second secondary ring is equal to or smaller than T/2, the sending of the timeslot arriving at or crossing the agent master node may be processed by adopting timeslot 2 or 2_2 with a black background in the drawing; when ΔL3 is greater than T/2, the sending of the timeslot arriving at or crossing the agent master node may be processed by adopting timeslot 2 or 2_1 with a black background in the drawing.

Therefore, in FIG. 4(a), in the path from the node A3 to the node D3, in the data frame K, the timeslot positions of timeslot 2 (A3→A) and timeslot 3 (A3→C3) of λ1 are as illustrated by black background timeslots in the drawing, since timeslot 2 (A3→A) needs to cross the agent master node D to enter the core ring, it may be sent in advance by ΔL3 on the basis of an ideal timeslot; it occupies timeslot 1 and timeslot 2 in the current path; since timeslot 3 ((A3→C3) does not need to cross the agent master node, no advance or delay processing in time needs to be performed to this timeslot.

When the ring length of the second secondary ring is not integral times of the timeslot length, the timeslot crossing the agent master node or crossing the ring will cause bandwidth wastage. Therefore, when the timeslot length is calculated, the ring length L3 of the secondary ring should be kept to be also integral times of the timeslot length as much as possible. When the ring length L3 of the secondary ring is not integral times of the timeslot length, in order to decrease the loss of the network bandwidth, when the master node allocates the bandwidth map, the timeslots which arrive at or cross the agent master node are all arranged on continuous timeslots as much as possible and a processing method of black background timeslot 2 in FIG. 4(b) is adopted.

Figure 5:
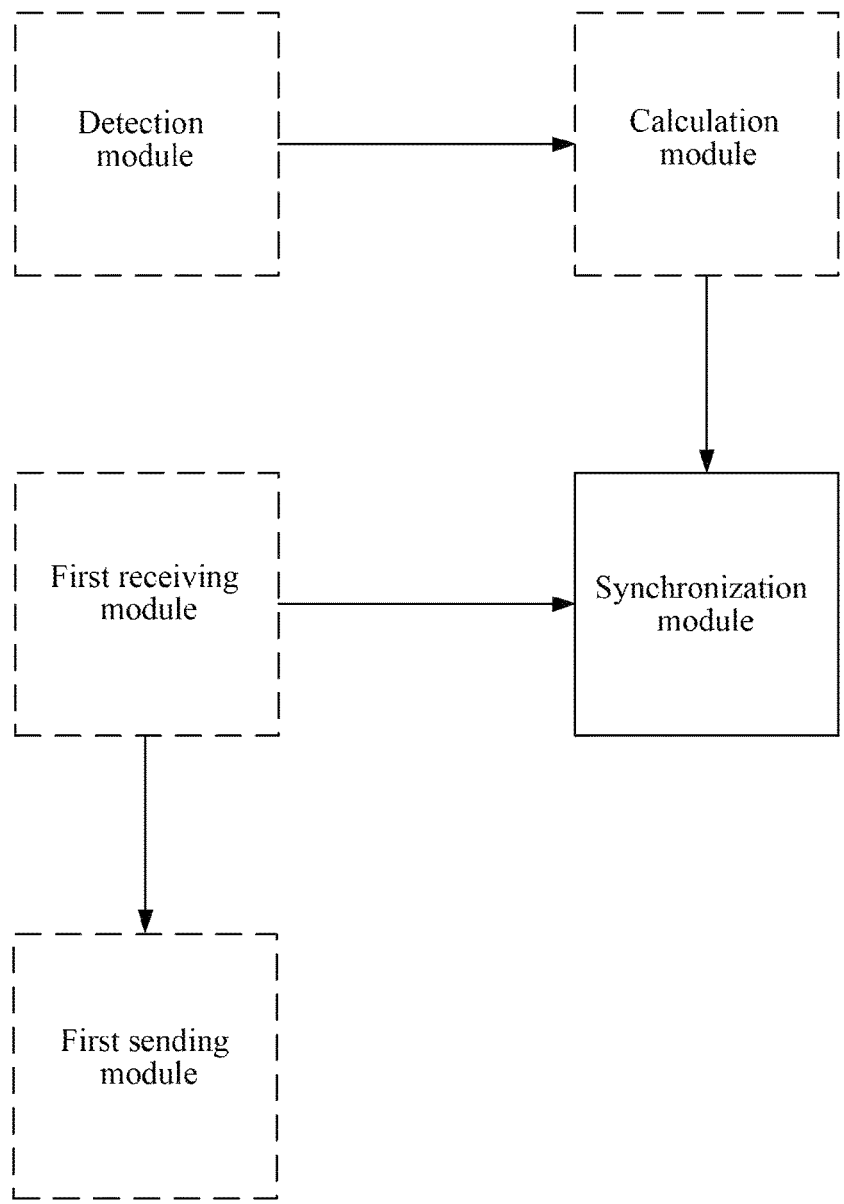
FIG. 5 illustrates a schematic diagram of structural components of a master node according to the embodiment of the present disclosure.

Referring to FIG. 5, the embodiment of the present disclosure further provides a master node, at least including:

a synchronization module arranged to perform timeslot synchronization training of a core path and a non-core path according to a timeslot length of an OBTN.

In the master node provided by the embodiment of the present disclosure, the master node further includes:

a detection module arranged to perform path detection on the OBTN to acquire a network topology structure; and select a core path from the acquired network topology structure, detect a length of the core path or a length of the core path and a length of a non-core path; and a calculation module arranged to calculate the timeslot length according to the length of the core path or the length of the core path and the length of the non-core path.

In the master node provided by the embodiment of the present disclosure, an operation that the detection module performs path detection on the OBTN to acquire the network topology structure includes:

respectively sending a first testing control frame containing node information of the master node to all slave nodes or agent master nodes connected with the master node; and after all first testing control frames are received, integrating paths in all first testing control frames to obtain the network topology structure.

In the master node provided by the embodiment of the present disclosure, the synchronization module is arranged to:

determine a first time interval that the master node in the core path sends a control frame prior to a data frame according to the timeslot length of the OBTN and determine a third time delay that each slave node or agent master node in the core path receives or sends the control frame prior to the data frame according to the first time interval and the timeslot length of the OBTN.

In the master node provided by the embodiment of the present disclosure, an operation that the synchronization module determines the first time interval that the master node in the core path sends the control frame prior to the data frame according to the timeslot length of the OBTN includes:

sequentially sending a first testing data frame and a second testing control frame to a slave node or agent master node in the core path according to the timeslot length of the OBTN, and measuring and receiving a first time delay that the second testing control frame and the first testing data frame return to the master node; receiving a second time delay from the agent master node; and determining the first time interval that the master node in the core path sends the control frame prior to the data frame according to the first time delay and the second time delay.

In the master node provided by the embodiment of the present disclosure, an operation that the synchronization module determines the first time interval that the master node in the core path sends the control frame prior to the data frame according to the timeslot length of the OBTN includes:

sequentially sending a first testing data frame and a second testing control frame to a slave node or agent master node in the core path according to the timeslot length of the OBTN; acquiring a second time interval between a moment that the second testing control frame is sent and a moment that the second testing control frame is received, and calculating a difference between the second time interval and the length of the core path to obtain a first time delay; receiving a second time delay from the agent master node; and determining the first time interval that the master node in the core path sends the control frame prior to the data frame according to the first time delay and the second time delay.

In the master node provided by the embodiment of the present disclosure, an operation that the synchronization module determines the third time delay that each slave node or agent master node in the core path receives or sends the control frame prior to the data frame according to the first time interval and the timeslot length of the OBTN includes:

sequentially sending a third testing data frame and a fourth testing control frame to a slave node or agent master node in the core path according to the timeslot length of the OBTN, the fourth testing control frame being sent prior to the third testing data frame by the first time interval.

In the master node provided by the embodiment of the present disclosure, the master node further includes:

a first receiving module arranged to receive a bandwidth request from a slave node in the core path; and a first sending module arranged to contain information indicating a timeslot that the slave node adopts a timeslot length to send data in bandwidth map information and send the bandwidth map information to each slave node in the core path.

In the master node provided by the embodiment of the present disclosure, the master node further includes:

a first receiving module arranged to receive a bandwidth request from a slave node in the non-core path and determine a path that the slave node sends data to a receiving node according to the bandwidth request; and a first sending module arranged to judge that the determined path does not cross an agent master node, contain information indicating a timeslot that the slave node adopts a timeslot length to send data in bandwidth map information and send the bandwidth map information to each slave node in the non-core path.

In the master node provided by the embodiment of the present disclosure, the master node further includes:

a first receiving module arranged to receive an excessive time length in the non-core path sent by each agent master node, receive a bandwidth request from a slave node in the non-core path and determine a path that the slave node sends data to a receiving node according to the bandwidth request; and a first sending module arranged to judge that the determined path crosses an agent master node and the excessive time length is greater than zero, contain information indicating a timeslot that crosses two timeslots is used to send data by the slave node in bandwidth map information and send the bandwidth map information to each slave node in the core path and the non-core path; and judge that the determined path crosses an agent master node and the excessive time length is equal to zero, contain information indicating a timeslot that the slave node adopts a timeslot length to send data in bandwidth map information and send the bandwidth map information to each slave node in the core path and the non-core path.

Figure 6:
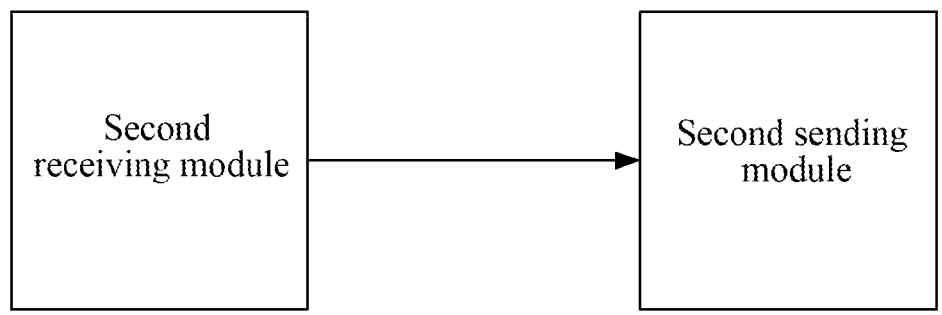
FIG. 6 illustrates a schematic diagram of structural components of an agent master node according to the embodiment of the present disclosure.

Referring to FIG. 6, the embodiment of the present disclosure further provides an agent master node, at least including:

a second receiving module arranged to receive a first testing data frame and a second testing control frame from a master node; and measure and receive a second time delay that a third testing control frame and a second testing data frame return to the agent master node; and a second sending module arranged to forward the second testing control frame to a next node in the core path after a fixed time delay after the second testing control frame is received, and directly forward the first testing data frame to a next node in the core network after the first testing data frame is received; sequentially send the second testing data frame and the third testing control frame to a slave node in a non-core path in which the agent master node is located according to a timeslot length of an OBTN; and send the second time delay to the master node.

Alternatively, in the agent master node provided by the embodiment of the present disclosure, the second receiving module is further arranged to, after the first testing control frame is received, add node information of the agent master node into the first testing control frame to form a path; and the second sending module is further arranged to send the first testing control frame added with the node information of the agent master node to other nodes connected with the agent master node after a fixed time delay.

Alternatively, in the agent master node provided by the embodiment of the present disclosure, the second sending module is further arranged to sequentially send the second testing data frame and the third testing control frame to a slave node in the non-core path in which the agent master node is located according to the timeslot length of the OBTN; and send the second time delay to the master node; and the second receiving module is further arranged to measure and receive a second time delay that the third testing control frame and the second testing data frame return to the agent master node.

Alternatively, in the agent master node provided by the embodiment of the present disclosure, the second sending module is further arranged to sequentially send the second testing data frame and the third testing control frame to a slave node in the non-core path in which the agent master node is located according to the timeslot length of the OBTN; and send the second time delay to the master node; and the second receiving module is further arranged to acquire a third time interval between a moment that the third testing control frame is sent and a moment that the third testing control frame is received, and calculate a difference between the obtained third time interval and the length of the non-core path in which the agent master node is located to obtain a second time delay.

Alternatively, in the agent master node provided by the embodiment of the present disclosure, the second receiving module is further arranged to measure a third time delay that the second receiving module receives a fourth testing control frame and a third testing data frame; and the second sending module is further arranged to forward the third testing data frame to a next slave node in the core path after the third testing data frame is received, and forward the fourth testing control frame to a next slave node in the core path after a fixed time delay after the fourth testing control frame is received.

Alternatively, in the agent master node provided by the embodiment of the present disclosure, the second sending module is further arranged to determine a fourth time delay that each slave node or agent master node in the non-core path receives or sends the control frame prior to the data frame according to the third time delay of the agent master node and the timeslot length of the OBTN.

Alternatively, in the agent master node provided by the embodiment of the present disclosure, the second sending module is arranged to:

sequentially send a fourth testing data frame and a fifth testing control frame to a slave node in the non-core path according to the timeslot length of the OBTN, the fifth testing control frame being sent prior to the fourth testing data frame by a difference between the third time delay of the agent master node and the fixed time delay.

Alternatively, in the agent master node provided by the embodiment of the present disclosure, the second receiving module is further arranged to receive a third testing data frame and a fourth testing control frame from the master node; and the second sending module is further arranged to send the third testing data frame and the fourth testing control frame to each slave node in the non-core network.

Figure 7:
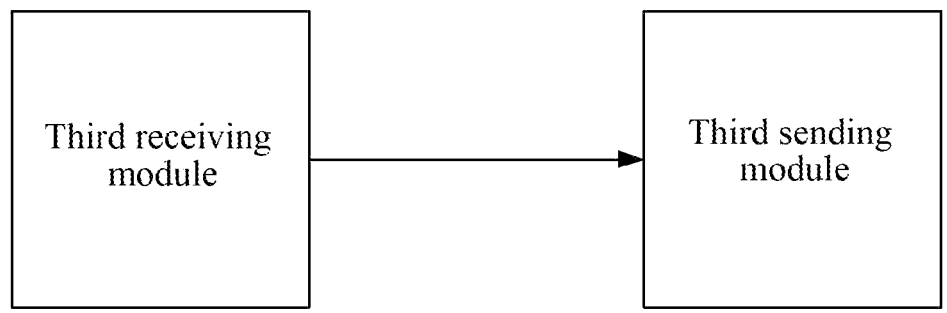
FIG. 7 illustrates a schematic diagram of structural components of a slave node according to the embodiment of the present disclosure.

As illustrated in FIG. 7, the embodiment of the present disclosure further provides a slave node, at least including:

a third receiving module arranged to receive a second testing control frame and a first testing data frame; and a third sending module arranged to forward the second testing control frame to a next node in a core path after a fixed time delay after the second testing control frame is received, and directly forward the first testing data frame to a next node in the core network after the first testing data frame is received.

Alternatively, in the slave node provided by the embodiment of the present disclosure, the third receiving module is further arranged to, after the first testing control frame is received, add node information of the slave node into the first testing control frame to form a path; and the third sending module is further arranged to send the first testing control frame added with the node information of the slave node to other nodes connected with the slave node after the fixed time delay.

Alternatively, in the slave node provided by the embodiment of the present disclosure, the third receiving module is further arranged to receive a third testing control frame and a second testing data frame; and the third sending module is further arranged to forward the third testing control frame to a next node in a non-core path after a fixed time delay after the third testing control frame is received, and directly forward the second testing data frame to a next node in the non-core network after the second testing data frame is received.

Alternatively, in the slave node provided by the embodiment of the present disclosure, the third receiving module is further arranged to measure a third time delay that the third receiving module receives a fourth testing control frame and a third testing data frame; and the third sending module is further arranged to forward the third testing data frame to a next slave node in the core path after the third testing data frame is received, and forward the fourth testing control frame to a next slave node in the core path after a fixed time delay after the fourth testing control frame is received.

Alternatively, in the slave node provided by the embodiment of the present disclosure, the third receiving module is further arranged to measure a fourth time delay that the third receiving module receives a fifth testing control frame and a fourth testing data frame; and the third sending module is further arranged to forward the fourth testing data frame to a next slave node in a non-core path after the fourth testing data frame is received, and forward the fifth testing control frame to a next slave node in the non-core path after a fixed time delay after the fifth testing control frame is received.

Alternatively, in the slave node provided by the embodiment of the present disclosure, the third receiving module is further arranged to measure a fourth time delay that the third receiving module receives the fourth testing control frame and the third testing data frame; and the third sending module is further arranged to forward the third testing data frame to a next slave node in the non-core path after the third testing data frame is received, and forward the fourth testing control frame to a next slave node in the non-core path after a fixed time delay after the fourth testing control frame is received.

Alternatively, in the slave node provided by the embodiment of the present disclosure, the third sending module or the third receiving module is further arranged to:

send or receive the data frame or the control frame at corresponding timeslot positions according to received bandwidth map information, the received third time delay or fourth time delay and a timeslot position at which the control frame is received.

One skilled in the art may understand that all or partial steps in the above-mentioned method may be completed by relevant hardware instructed by a program, and the program may be stored in a computer readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by means of hardware and may also be implemented by means of a software function module. The embodiments of the present disclosure are not limited to combinations of hardware and software in any specific form.

INDUSTRIAL APPLICABILITY

By adopting the solution provided by the embodiments of the present disclosure, an FDL does not need to be considered in node design, the node design is simplified, the time precision of synchronization is improved and no loss is caused to optical efficiency.

What I claim is:

1. A method for implementing timeslot synchronization, applied to an Optical Burst Transport Network OBTN, comprising:

performing, by a master node, timeslot synchronization training of the OBTN according to a timeslot length of the OBTN;

before performing, by the master node, timeslot synchronization training of the OBTN according to the timeslot length of the OBTN, the method further comprising:

performing, by the master node, path detection on the OBTN to acquire a network topology structure; and selecting, by the master node, a core path from the acquired network topology structure, detecting a length of the core path or a length of the core path and a length of a non-core path, and calculating the timeslot length according to the length of the core path or the length of the core path and the length of the non-core path.

2. The method according to claim 1, wherein the step of performing, by the master node, path detection on the OBTN to acquire the network topology structure comprises:
respectively sending, by the master node, a first testing control frame containing node information of the master node to all slave nodes or agent master nodes connected with the master node;
after the first testing control frame is received, adding, by the slave nodes or the agent master nodes, node information of the slave nodes or the agent master nodes into the first testing control frame to form a path, and sending the first testing control frame added with the node information of the slave nodes or the agent master nodes to other nodes connected with the slave nodes or the agent master nodes after a fixed time delay; and
after all first testing control frames are received, integrating, by the master node, paths in all first testing control frames to obtain the network topology structure.

3. The method according to claim 1, wherein the step of performing, by the master node, timeslot synchronization training of the OBTN according to the timeslot length of the OBTN comprises:
determining, by the master node, a first time interval that the master node in the core path of the OBTN sends a control frame prior to a data frame according to the timeslot length of the OBTN.

4. The method according to claim 3, wherein the step of determining, by the master node, the first time interval that the master node in the core path sends the control frame prior to the data frame according to the timeslot length of the OBTN comprises:
sequentially sending, by the master node, a first testing data frame and a second testing control frame to a slave node or agent master node in the core path according to the timeslot length of the OBTN; forwarding, by the slave node or the agent master node, the second testing control frame to a next node in the core path after a fixed time delay after the second testing control frame is received, and directly forwarding the first testing data frame to a next node in the core network after the first testing data frame is received; and measuring, by the master node, a first time delay that is time difference between the second testing control frame returning to the master node and the first testing data frame returning to the master node;
sequentially sending, by the agent master node, a second testing data frame and a third testing control frame to a slave node in a non-core path in which the agent master node is located according to the timeslot length of the OBTN; forwarding, by the slave node, the third testing control frame to a next node in the non-core path after a fixed time delay after the third testing control frame is received, and directly forwarding the second testing data frame to a next node in the non-core network after the second testing data frame is received; and measuring, by the agent master node, a second time delay that is time difference between the third testing control frame returning to the agent master node and the second testing data frame returning to the agent master node;
receiving, by the master node, the second time delay from the agent master node; and
determining, by the master node, the first time interval that the master node in the core path sends the control frame prior to the data frame according to the first time delay and the second time delay;

or sequentially sending, by the master node, a first testing data frame and a second testing control frame to a slave node or agent master node in the core path according to the timeslot length of the OBTN; forwarding, by the slave node or the agent master node, the second testing control frame to a next node in the core path after a fixed time delay after the second testing control frame is received, and directly forwarding the first testing data frame to a next node in the core network after the first testing data frame is received; and acquiring, by the master node, a second time interval between a moment that the second testing control frame is sent and a moment that the second testing control frame is received, and calculating a difference between the acquired second time interval and the length of the core path to obtain a first time delay;
sequentially sending, by the agent master node, a second testing data frame and a third testing control frame to a slave node in the non-core path in which the agent master node is located according to the timeslot length of the OBTN; forwarding, by the slave node, the third testing control frame to a next node in the non-core path after a fixed time delay after the third testing control frame is received, and directly forwarding the second testing data frame to a next node in the non-core network after the second testing data frame is received; and acquiring, by the agent master node, a third time interval between a moment that the third testing control frame is sent and a moment that the third testing control frame is received, and calculating a difference between the acquired third time interval and the length of the non-core path in which the agent master node is located to obtain a second time delay;
receiving, by the master node, the second time delay from the agent master node; and
determining, by the master node, the first time interval that the master node in the core path sends the control frame prior to the data frame according to the first time delay and the second time delay.

5. The method according to claim 4, wherein the step of performing, by the master node, timeslot synchronization training of the OBTN according to the timeslot length of the OBTN further comprises:
determining a third time delay that each slave node or agent master node in the core path receives or sends the control frame prior to the data frame according to the first time interval and the timeslot length, determining, by the agent master node, a fourth time delay that each slave node or agent master node in the non-core path of the OBTN receives or sends the control frame prior to the data frame according to the third time delay of the agent master node and the timeslot length;
wherein the step of determining the third time delay that each slave node or agent master node in the core path receives or sends the control frame prior to the data frame according to the first time interval and the timeslot length comprises:
sequentially sending, by the master node, a third testing data frame and a fourth testing control frame to a slave node or agent master node in the core path according to the timeslot length, the fourth testing control frame being sent prior to the third testing data frame by the first time interval; and measuring, by the slave node or the agent master node, the third time delay that is time difference between receiving the fourth testing control frame and receiving the third testing data frame for the slave node or the agent master node, forwarding the third testing data frame to a next slave node in the core path after the third testing data frame is received, and forwarding the fourth testing control frame to a next slave node in the core path after a fixed time delay after the fourth testing control frame is received;

wherein the step of determining the fourth time delay that each slave node or agent master node in the non-core path of the OBTN receives or sends the control frame prior to the data frame according to the third time delay of the agent master node and the timeslot length comprises:

sequentially sending, by the agent master node, a fourth testing data frame and a fifth testing control frame to a slave node in the non-core path according to the timeslot length, the fifth testing control frame being sent prior to the fourth testing data frame by a difference between the third time delay of the agent master node and the fixed time delay; and measuring, by each slave node, the fourth time delay that is time difference between receiving the fifth testing control frame and receiving the fourth testing data frame for each slave node, forwarding the fourth testing data frame to a next slave node in the non-core path after the fourth testing data frame is received, and forwarding the fifth testing control frame to a next slave node in the non-core path after a fixed time delay after the fifth testing control frame is received;

or forwarding, by the agent master node, the third testing data frame and fourth testing control frame from the master node to each slave node in the non-core path; and measuring, by each slave node, the fourth time delay that is time difference between receiving the fourth testing control frame and receiving the third testing data frame for each slave node, forwarding the third testing data frame to a next slave node in the non-core path after the third testing data frame is received and forwarding the fourth testing control frame to a next slave node in the non-core path after a fixed time delay after the fourth testing control frame is received.

6. The method according to claim 5, wherein the method further comprises:

receiving, by the master node, a bandwidth request from a slave node in the core path;

containing, by the master node, information indicating a timeslot that the slave node adopts a timeslot length to send data in bandwidth map information and sending the bandwidth map information to each slave node in the core path; and sending or receiving, by each slave node in the core path, the data frame and the control frame at corresponding timeslot positions according to the received bandwidth map information, the third time delay and a timeslot position at which the control frame is received;

or receiving, by the master node, a bandwidth request from a slave node in the non-core path;

determining, by the master node, a path that the slave node sends data to a receiving node according to the bandwidth request;

judging, by the master node, that the determined path does not cross an agent master node, containing information indicating a timeslot that the slave node adopts a timeslot length to send data in bandwidth map information and sending the bandwidth map information to each slave node in the non-core path; and sending or receiving, by each slave node in the non-core path, the data frame and the control frame at corresponding timeslot positions according to the received bandwidth map information, the fourth time delay and a timeslot position at which the control frame is received;

or calculating, by each agent master node, an excessive time length in the non-core path according to the length of the non-core path in which the agent master node is located, and sending the calculated excessive time length to the master node;

receiving, by the master node, a bandwidth request from a slave node in the non-core path and determining a path that the slave node sends data to a receiving node according to the bandwidth request;

judging, by the master node, that the determined path crosses an agent master node and the excessive time length is greater than zero, and containing, by the master node, bandwidth map information indicating a timeslot that crosses two timeslots is used to send data by the slave nodes and sending the bandwidth map information to each slave node in the core path and the non-core path; and judging, by the master node, that the determined path crosses an agent master node and the excessive time length is equal to zero, and the master node containing information indicating a timeslot that the slave node adopts a timeslot length to send data in bandwidth map information and sending the bandwidth map information to each slave node in the core path and the non-core path; and sending or receiving, by each slave node, the data frame and the control frame at corresponding timeslot positions according to the received bandwidth map information, the fourth time delay and a timeslot position at which the control frame is received.

7. A non-transitory computer-readable storage medium, storing program instructions, when executed by a computer, cause the computer to performing the method according to claim 1.

8. A master node, comprising:

a computer; and a non-transitory computer readable storage medium storing instruction that, when executed by the computer, cause the computer to perform steps comprising:

performing timeslot synchronization training of an Optical Burst Transport Network OBTN according to a timeslot length of the OBTN;

performing path detection on the OBTN to acquire a network topology structure; and selecting a core path from the acquired network topology structure, detecting a length of the core path or a length of the core path and a length of a non-core path; and calculating the timeslot length according to the length of the core path or the length of the core path and the length of the non-core path, wherein the performing path detection on the OBTN to acquire the network topology structure comprises:

respectively sending a first testing control frame containing node information of the master node to all slave nodes or agent master nodes connected with the master node; and after all first testing control frames are received, integrating paths in all first testing control frames to obtain the network topology structure.

9. The master node according to claim 8, wherein the steps further comprise: determining a first time interval that the master node in the core path sends a control frame prior to a data frame according to the timeslot length of the OBTN.

10. The master node according to claim 9, wherein determining the first time interval that the master node in the core path sends the control frame prior to the data frame according to the timeslot length of the OBTN comprises:
sequentially sending a first testing data frame and a second testing control frame to a slave node or agent master node in the core path according to the timeslot length of the OBTN, and measuring a first time delay that is time difference between the second testing control frame returning to the master node and the first testing data frame returning to the master node; receiving a second time delay from the agent master node; and determining the first time interval that the master node in the core path sends the control frame prior to the data frame according to the first time delay and the second time delay; wherein the second time delay is time difference between a third testing control frame returning to the agent master node and a second testing data frame returning to the agent master node;
or
sequentially sending a first testing data frame and a second testing control frame to a slave node or agent master node in the core path according to the timeslot length of the OBTN;
acquiring a second time interval between a moment that the second testing control frame is sent and a moment that the second testing control frame is received, and calculating a difference between the second time interval and the length of the core path to obtain a first time delay; receiving a second time delay from the agent master node; and determining the first time interval that the master node in the core path sends the control frame prior to the data frame according to the first time delay and the second time delay; wherein the second time delay is time difference between a third testing control frame returning to the agent master node and a second testing data frame returning to the agent master node.

11. The master node according to claim 10, wherein the steps further comprise:
determining a third time delay that each slave node or agent master node in the core path receives or sending the control frame prior to the data frame according to the first time interval and the timeslot length of the OBTN;
wherein determining the third time delay that each slave node or agent master node in the core path receives or sends the control frame prior to the data frame according to the first time interval and the timeslot length of the OBTN comprises:
sequentially sending a third testing data frame and a fourth testing control frame to a slave node or agent master node in the core path according to the timeslot length of the OBTN, the fourth testing control frame being sent prior to the third testing data frame by the first time interval.

12. The master node according to claim 9, wherein the steps further comprise: receiving a bandwidth request from a slave node in the core path; and containing information indicating a timeslot that the slave node adopts a timeslot length to send data in bandwidth map information and send the bandwidth map information to each slave node in the core path;
or
receiving a bandwidth request from a slave node in the non-core path and determining a path that the slave node sends data to a receiving node according to the bandwidth request; and
judging that the determined path does not cross an agent master node, containing information indicating a timeslot that the slave node adopts a timeslot length to send data in bandwidth map information and sending the bandwidth map information to each slave node in the non-core path;
or
receiving an excessive time length in the non-core path sent by each agent master node, receiving a bandwidth request from a slave node in the non-core path and determining a path that the slave node sends data to a receiving node according to the bandwidth request; and
judging that the determined path crosses an agent master node and the excessive time length is greater than zero, containing bandwidth map information indicating a timeslot that crosses two timeslots is used to send data by the slave node and sending the bandwidth map information to each slave node in the core path and the non-core path; and judging that the determined path crosses an agent master node and the excessive time length is equal to zero, containing information indicating a timeslot that the slave node adopts a timeslot length to send data in bandwidth map information and sending the bandwidth map information to each slave node in the core path and the non-core path.

13. An agent master node, comprising:
a computer; and
a non-transitory computer readable storage medium storing instructions that, when executed by the computer, cause the computer to perform steps comprising:
receiving a first testing data frame, a first testing control frame and a second testing control frame from a master node; wherein a first time delay is time difference between the second testing control frame returning to a master node and the first testing data frame returning to the master node;
measuring a second time delay that is time difference between a third testing control frame returning to the agent master node and a second testing data frame returning to the agent master node; and
forwarding the second testing control frame to a next node in the core path after a fixed time delay after the second testing control frame is received, and directly forwarding the first testing data frame to a next node in the core network after the first testing data frame is received;
sequentially sending the second testing data frame and the third testing control frame to a slave node in a non-core path in which the agent master node is located according to a timeslot length of an OBTN; and sending the second time delay to the master node.

14. The agent master node according to claim 13, wherein, the steps further comprise:
after the first testing control frame is received, adding node information of the agent master node into the first testing control frame to form a path; and sending the first testing control frame added with the node information of the agent master node to other nodes connected with the agent master node after a fixed time delay;

measuring a third time delay that is time difference between receiving a fourth testing control frame and receiving a third testing data frame; and forwarding the third testing data frame to a next slave node in the core path after the third testing data frame is received, and forwarding the fourth testing control frame to a next slave node in the core path after a fixed time delay after the fourth testing control frame is received.

15. The agent master node according to claim 14, wherein the steps further comprise: determining a fourth time delay that each slave node or agent master node in the non-core path receives or sending the control frame prior to the data frame according to the third time delay of the agent master node and the timeslot length of the OBTN;

or sequentially sending a fourth testing data frame and a fifth testing control frame to a slave node in the non-core path according to the timeslot length of the OBTN, the fifth testing control frame being sent prior to the fourth testing data frame by a difference between the third time delay of the agent master node and the fixed time delay;

or receiving the third testing data frame and the fourth testing control frame from the master node; and sending the third testing data frame and the fourth testing control frame to each slave node in the non-core network.

16. A slave node, comprising:

a computer; and a non-transitory computer readable storage medium storing instructions that, when executed by the computer, cause the computer to perform steps comprising:

receiving a first testing control frame, a second testing control frame and a first testing data frame; and forwarding the second testing control frame to a next node in a core path after a fixed time delay after the second testing control frame is received, and directly forwarding the first testing data frame to a next node in the core network after the first testing data frame is received.

17. The slave node according to claim 16, wherein, the steps further comprise:

after the first testing control frame is received, adding node information of the slave node into the first testing control frame to form a path; and sending the first testing control frame added with the node information of the slave node to other nodes connected with the slave node after the fixed time delay;

or receiving a third testing control frame and a second testing data frame; and forwarding the third testing control frame to a next node in a non-core path after a fixed time delay after the third testing control frame is received, and directly forwarding the second testing data frame to a next node in the non-core network after the second testing data frame is received;

or measuring a time delay that is time difference between receiving a fourth testing control frame and receiving a third testing data frame; and forwarding the third testing data frame to a next slave node in the core path after the third testing data frame is received, and forwarding the fourth testing control frame to a next slave node in the core path after a fixed time delay after the fourth testing control frame is received.

18. The slave node according to claim 17, wherein, the steps further comprise:

measuring a time delay that is time difference between receiving a fifth testing control frame and receiving a fourth testing data frame; and forwarding the fourth testing data frame to a next slave node in a non-core path after the fourth testing data frame is received, and forwarding the fifth testing control frame to a next slave node in the non-core path after a fixed time delay after the fifth testing control frame is received;

or measuring a time delay that is time difference between receiving the fourth testing control frame and receiving the third testing data frame; and forwarding the third testing data frame to a next slave node in the non-core path after the third testing data frame is received, and forwarding the fourth testing control frame to a next slave node in the non-core path after a fixed time delay after the fourth testing control frame is received;

or sending or receiving the data frame or the control frame at corresponding timeslot positions according to received bandwidth map information, received time delay and a timeslot position at which the control frame is received.

* * * * *